(12) United States Patent
Sakane

(10) Patent No.: US 10,946,722 B2
(45) Date of Patent: Mar. 16, 2021

(54) HEATER DEVICE

(71) Applicant: DENSO CORPORATION, Kariya (JP)

(72) Inventor: Hiroyuki Sakane, Kariya (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 15/743,742

(22) PCT Filed: Jul. 28, 2016

(86) PCT No.: PCT/JP2016/072184
§ 371 (c)(1),
(2) Date: Jan. 11, 2018

(87) PCT Pub. No.: WO2017/033660
PCT Pub. Date: Mar. 2, 2017

(65) Prior Publication Data
US 2018/0201095 A1 Jul. 19, 2018

(30) Foreign Application Priority Data
Aug. 27, 2015 (JP) .............................. JP2015-168147

(51) Int. Cl.
B60H 1/22 (2006.01)
B60H 1/00 (2006.01)
H05B 3/34 (2006.01)

(52) U.S. Cl.
CPC ....... *B60H 1/2218* (2013.01); *B60H 1/00985* (2013.01); *B60H 1/2226* (2019.05);
(Continued)

(58) Field of Classification Search
CPC .... H05B 2203/029; H05B 3/34; H05B 3/342; B60H 1/2218; B60H 1/00985;
(Continued)

(56) References Cited

U.S. PATENT DOCUMENTS 5,325,650 A * 7/1994 Fuse ................... A01D 43/0631
56/10.2 R
2010/0130808 A1* 5/2010 Hattori ............... B60H 1/00742
600/9

(Continued)

FOREIGN PATENT DOCUMENTS

JP 2006017416 A 1/2006
JP 2011096506 A 5/2011
(Continued)

OTHER PUBLICATIONS

U.S. Appl. No. 15/562,812, filed Sep. 28, 2017, Seki et al.

*Primary Examiner* — Tu B Hoang
*Assistant Examiner* — Yeong Juen Thong
(74) *Attorney, Agent, or Firm* — Harness, Dickey & Pierce, P.L.C.

(57) ABSTRACT

A heater unit emits radiation heat caused by heat generated with a heat generation unit when energized. The heater device includes a contact detection unit having a contact detection region overlying the heater unit to detect a contact by an object on the contact detection region. The heater device includes a determination unit to determine, when a contact by the object on the contact detection region is detected by the contact detection unit, whether the contact is for a predetermined switching operation. A control unit stops energization of the heat generation unit when the determination unit determines that the contact is not for the predetermined switching operation. The control unit switches between a start and a stop of energization of the heat generation unit when the determination unit determines that the contact is for the switching operation.

11 Claims, 11 Drawing Sheets

(52) U.S. Cl.
CPC ............... *H05B 3/34* (2013.01); *H05B 3/342* (2013.01); *B60H 2001/2231* (2013.01); *B60H 2001/2262* (2013.01); *B60H 2001/2265* (2013.01); *B60H 2001/2287* (2013.01); *B60H 2001/2293* (2013.01); *H05B 2203/029* (2013.01)

(58) Field of Classification Search
CPC .......... B60H 1/2216; B60H 2001/2231; B60H 2001/2262; B60H 2001/2265; B60H 2001/2287; B60H 2001/2293
USPC .................................. 219/202, 217; 392/435
See application file for complete search history.

(56) References Cited

U.S. PATENT DOCUMENTS

| | | |
|---|---|---|
| 2011/0103092 A1 | 5/2011 | Matsui |
| 2015/0110477 A1* | 4/2015 | Ota .................... B60H 1/2227 392/435 |
| 2016/0046174 A1 | 2/2016 | Sagou et al. |
| 2016/0101805 A1* | 4/2016 | Nishio .................... H05B 6/02 219/204 |
| 2016/0200172 A1 | 7/2016 | Nakashima et al. |

FOREIGN PATENT DOCUMENTS

| | | |
|---|---|---|
| JP | 2012236473 A | 12/2012 |
| JP | 2014208515 A | 11/2014 |
| JP | 2015063293 A | 4/2015 |
| WO | WO-2016013168 A1 | 1/2016 |
| WO | WO-2016163175 A1 | 10/2016 |

\* cited by examiner

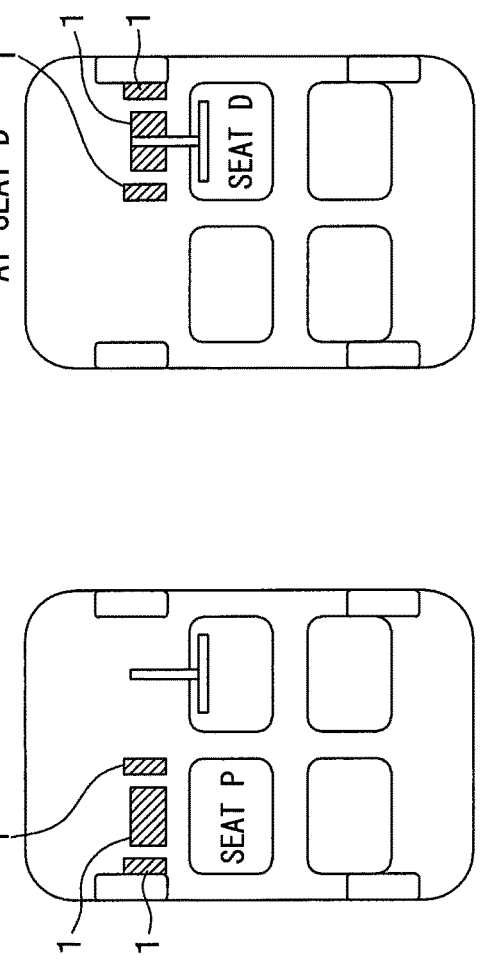
FIG. 17A HEATER AT SEAT P
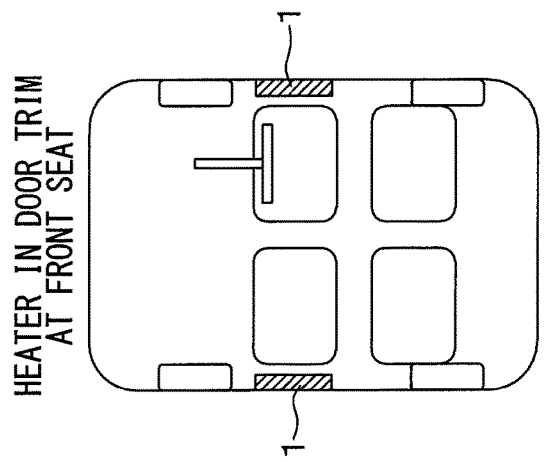
FIG. 17B HEATER UNDERNEATH INSTRUMENT PANEL AT SEAT D
FIG. 17C HEATER IN DOOR TRIM AT FRONT SEAT
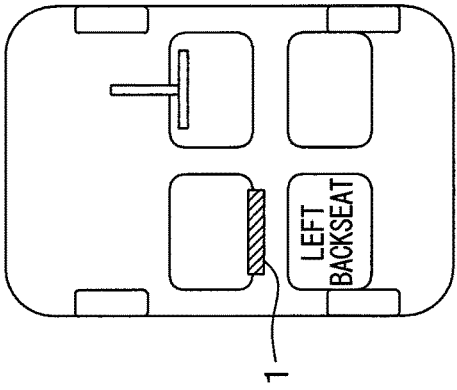
FIG. 17D HEATER AT LEFT BACKSEAT
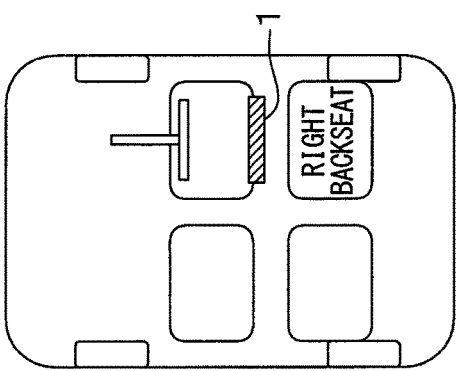
FIG. 17E HEATER AT RIGHT BACKSEAT
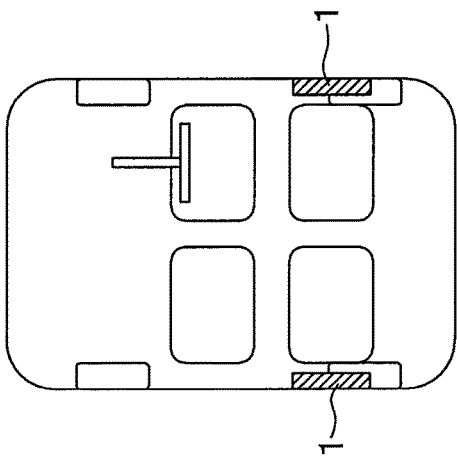
FIG. 17F HEATER IN DOOR TRIM AT BACKSEAT

HEATER DEVICE

TECHNICAL FIELD

The present disclosure relates to a heater device.

CROSS REFERENCE TO RELATED APPLICATIONS

This application is a U.S. National Phase Application under 35 U.S.C. 371 of International Application No. PCT/JP2016/072184 filed on Jul. 28, 2016 and published in Japanese as WO 2017/033660 A1 on Mar. 2, 2017. This application is based on and claims the benefit of priority from Japanese Patent Application No. 2015-168147 filed on Aug. 27, 2015. The entire disclosures of all of the above applications are incorporated herein by reference.

BACKGROUND ART

A radiant heater device in the related art includes a substrate unit emitting radiation heat due to heat from a heat generation unit, and output control means for controlling an output of the heat generation unit (see, for example, Patent Literature 1). The heater device has a dedicated operation switch to turn on and off the heater device and adjust an output level. An occupant turns on and off the heater device by operating the dedicated operation switch.

CITATION LIST

Patent Literature

PATENT LITERATURE 1: JP-A-2014-208515

SUMMARY OF INVENTION

The heater device described in Patent Literature 1 may be attached to more than one place in a vehicle, for example, underneath an instrument panel of the vehicle, a door trim of the vehicle, and a ceiling. Alternatively, the heater device described in Patent Literature 1 may be installed individually for occupants seated in respective seats of the vehicle, namely an occupant seated in a driver's seat, an occupant seated in a passenger seat, and an occupant seated in each backseat.

When the heater device is attached to more than one place in the vehicle as above, a distance between the heater device and an occupant varies with an attached position of the heater device. Hence, it is preferable that on and off states of the heater devices can be set device by device. In a case where the heater devices are installed individually for occupants seated in the respective seats of the vehicle, it is preferable that on and off states of the heater devices can be set device by device as each occupant desires.

However, a configuration by which the heater device is attached to more than one place in the vehicle raises a need to secure spaces to mount dedicated operation switches wherever necessary in a compartment, and flexibility in vehicle layout for the heater device is lowered.

The present disclosure ensures flexibility in vehicle layout for a heater device and enables a heater control in response to a heater operation.

According to one aspect of the present disclosure, a heater device comprises a heater unit including a heat generation unit, which is to generate heat when energized, and to emit radiation heat caused by heat generated with the heat generation unit; a contact detection unit having a contact detection region, which is provided to overlie the heater unit to detect a contact by an object, and to detect a contact by an object on the contact detection region; and a determination unit to determine, when the contact detection unit detects a contact by an object on the contact detection region, whether the contact by the object on the contact detection region is a contact made for a predetermined switching operation. The heater device further comprises a control unit: to stop energization of the heat generation unit, when the determination unit determines that the contact by the object on the contact detection region is not a contact made for the predetermined switching operation; and to switch between a start and a stop of energization of the heat generation unit when the determination unit determines that the contact by the object on the contact detection region is a contact made for the switching operation.

According to the configuration as above, the control unit stops energization of the heat generation unit when the determination unit determines that a contact by an object on the contact detection region is not a contact made for a switching operation, and switches between a start and a stop of energization of the heat generation unit when the determination unit determines that a contact by an object on the contact detection region is a contact made for the switching operation. Hence, a need to secure a space to mount a dedicated operation switch can be eliminated. Consequently, flexibility in vehicle layout for the heater device can be ensured while enabling a heater control in response to a heater operation.

BRIEF DESCRIPTION OF THE DRAWINGS

The above and other objects, features and advantages of the present disclosure will become more apparent from the following detailed description made with reference to the accompanying drawings. In the drawings:

FIGS. 17A to 17F are views showing mount positions of heater devices; and

DESCRIPTION OF EMBODIMENTS

Figure 1:
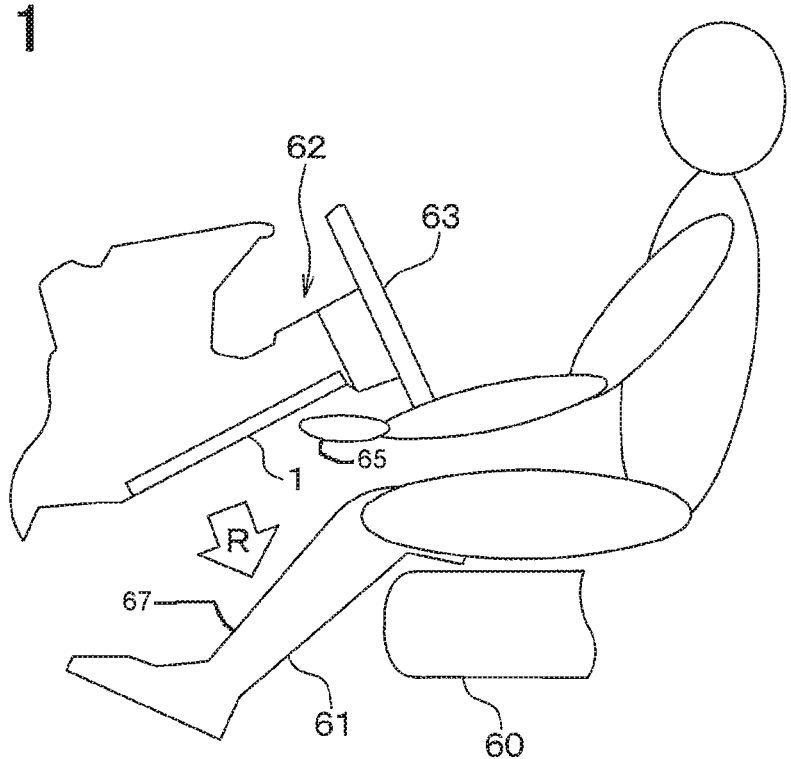
FIG. 1 is a view of a heater device according to a first embodiment of the present disclosure.

Hereinafter, embodiments of the present disclosure will be described with reference to the drawings. Same or equivalent portions in respective embodiments below are denoted by same reference numerals in the drawings.

First Embodiment

As shown in FIG. 1, a heater device 1 of a first embodiment is installed to a road motor vehicle. The heater device 1 is an electrical heater which generates heat on power fed from a power supply, such as a vehicle-mounted battery or a power generator. For example, the road motor vehicle has a steering column 62 to support a steering wheel 63. The heater device 1 is provided underneath the steering column 62 to be opposed to an occupant 61 seated on an occupant's seat 60. The heater device 1 generates heat when power is supplied. In order to heat a subject positioned in a direction perpendicular to a surface of the heater device 1, the heater device 1 emits radiation heat R mainly in a direction perpendicular to the surface of the heater device 1.

Figure 2:
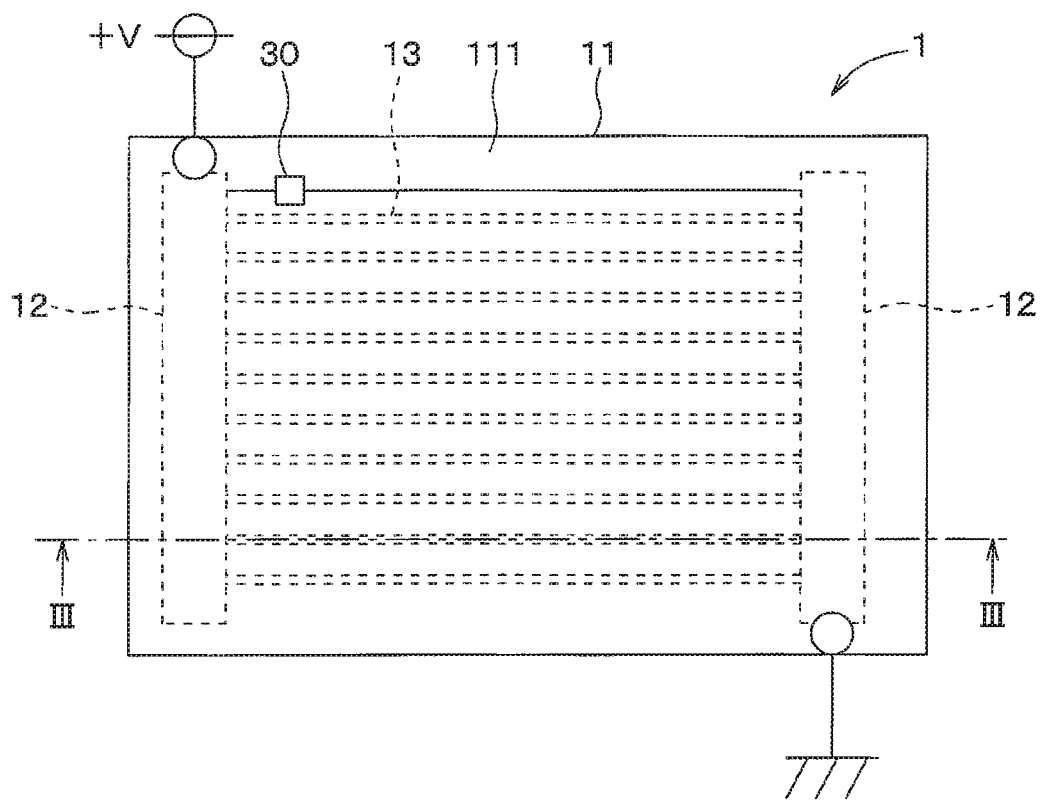
FIG. 2 is a schematic view of the heater device.
Figure 3:
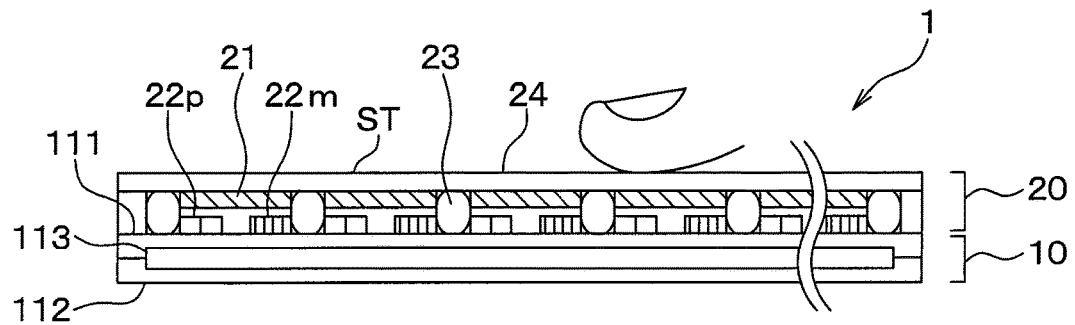
FIG. 3 is a schematic sectional view taken along the line III-III of FIG. 2.

As shown in FIG. 2, the heater device 1 is formed in a shape of substantially a square thin plate. As shown in FIG. 3, the heater device 1 has a heater unit 10 in a thin-plate shape and a contact detection unit 20. In FIG. 2, the contact detection unit 20 is omitted.

The heater unit 10 has a substrate unit 11, multiple heat generation units 13, and a pair of terminals 12 forming a conduction unit. The substrate unit 11 is made from a resin material which produces an excellent electrical insulation property and withstands a high temperature. The substrate unit 11 is a multi-layered substrate. The substrate unit 11 has a top surface layer 111, a rear surface layer 112, and an intermediate layer 113. The top surface layer 111 faces to a side, which is beyond the contact detection unit 20, to which the radiation heat R is emitted (that is, to an upper side in FIG. 3) via the contact detection unit 20. The rear surface layer 112 forms a back side of the heater device 1. The intermediate layer 113 supports the heat generation units 13 and the terminals 12. The substrate unit 11 is a member to support the multiple heat generation units 13 in a linear shape. The top surface layer 111, the rear surface layer 112, and the intermediate layer 113 are insulation units formed of a material having lower thermal conductivity than the heat generation units 13 and the terminals 12. For example, the top surface layer 111, the rear surface layer 112, and the intermediate layer 113 are formed of polyimide resin.

Each of the multiple heat generation units 13 is formed of a material which generates heat when energized. The heat generation units 13 can be formed of a metallic material. For example, the heat generation units 13 can be formed of copper, silver, tin, stainless, nickel, Nichrome, and the like. The multiple heat generation units 13 are in a linear or plate shape parallel to a plane of the substrate unit 11 and distributed across the surface of the substrate unit 11.

Each heat generation unit 13 is connected to a pair of the terminals 12 provided at a predetermined interval. Each heat generation unit 13 is provided between a pair of the terminals 12 and spaced apart from another adjacent heat generation unit 13. The multiple heat generation units 13 are provided across substantially the entire surface of the substrate unit 11 to extend from one end to the other between a pair of the terminals 12 and connected to a pair of the terminals 12 in parallel with one another. The multiple heat generation units 13 together with the intermediate layer 113 are provided to be sandwiched between the top surface layer 111 and the rear surface layer 112. The multiple heat generation units 13 are protected from an outside by the substrate unit 11.

The heater unit 10 of the present embodiment is of a configuration same as a configuration in the related art described in, for example, JP-A-2014-208515.

An output, a temperature, a heating value of the heat generation unit 13 are controlled by a control unit 43 of a heater ECU 40 described below. The control unit 43 is capable of controlling an output, a temperature, a heating value, and the like of the heat generation unit 13 by controlling a voltage value and a current value applied to the heat generation unit 13. Hence, the control unit 43 controls an amount of radiation heat to be given to the occupant 61 variably. When energization of the heater device 1 is started by the control unit 43, a surface temperature of the heater device 1 rises rapidly to a predetermined radiation temperature as a controlled target temperature. Hence, warmness can be provided to the occupant 61 quickly even in wintertime or the like.

The heater portion 10 of the present embodiment has an energization state indicator lamp 30. The energization state indicator lamp 30 is a display unit indicating energization of the heat generation units 13 when the heat generation units 13 are energized. The energization state indicator lamp 30 of the present embodiment is formed of a small LED chip. The energization state indicator lamp 30 emits blue light.

The energization state indicator lamp 30 is connected in parallel to the respective heat generation units 13 between a pair of the terminals 12. The energization state indicator lamp 30 illuminates when power is supplied to the heater unit 10 and a predetermined voltage is applied between a pair of the terminals 12. The energization state indicator lamp 30 goes off when a supply of power to the heater unit 10 is stopped and a potential difference between a pair of the terminals 12 decreases to zero. When disconnection occurs while a predetermined voltage is applied between a pair of the terminals 12, the energization state indicator lamp 30 ceases to illuminate.

The heater device 1 of the present embodiment has the contact detection unit 20. The contact detection unit 20 has a contact 21, a positive electrode 22p, a negative electrode 22m, a spacer 23, and a cover 24. Each of the contact 21, the positive electrode 22p, and the negative electrode 22m is formed of conductive resin or conductive metal.

The contact detection unit 20 has a large number of switches aligned at a regular interval. One switch is formed of one contact 21, one positive electrode 22p, and one negative electrode 22m. The switches are provided substantially all over the heater unit 10. The contact detection unit 20 has a contact detection region ST, which is provided to overlie the heater unit 10 and to detect a contact by an object, and detects a contact by an object on the contact detection region ST. The contact detection region ST is provided substantially all over the heater unit 10 to detect a contact by an object on the heater unit 10. The contact detection region ST is formed to extend in a planar shape.

The respective positive electrodes 22p and the respective negative electrodes 22m are provided to the top surface layer 111 of the heater unit 10. The respective contacts 21 are provided to the cover 24 on a surface on a side of the heater unit 10. The spacers 23 are formed of insulating resin.

Spaces are formed between the contact 21 and the positive electrode 22p and between the contact 21 and the negative electrode 22m by the spacers 23. Hence, the contact 21 is out of contact with the positive electrode 22p and the negative electrode 22m. That is, the contact 21 is electrically isolated from the positive electrode 22p by the spacer 23, and the contact 21 is also electrically isolated from the negative electrode 22m by the spacer 23.

When the cover 24 is pressed by a finger of the occupant in a direction from a surface side of the cover 24 to the contact 21, the cover 24 undergoes deformation and the contact 21 undergoes displacement. The contact 21 thus makes contact with the positive electrode 22p and the negative electrode 22m. When the contact 21 makes contact with the positive electrode 22p and the negative electrode 22m in the manner as above, the positive electrode 22p and the negative electrode 22p become electrically conductive via the contact 21.

When a pressing force in the direction from the surface side of the cover 24 to the contact 21 is no longer applied, the cover 24 restores to a shape before deformation due to the spacers 23, and the contact 21 loses contact with the positive electrode 22p and the negative electrode 22m. When the contact 21 becomes out of contact with the positive electrode 22p and the negative electrode 22m as above, the positive electrode 22p and the negative electrode 22m become electrically non-conductive.

Figure 4:
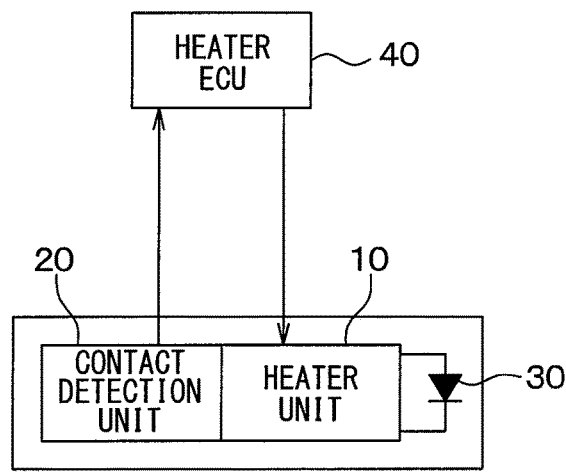
FIG. 4 is a schematic block diagram of the heater device.
Figure 5:
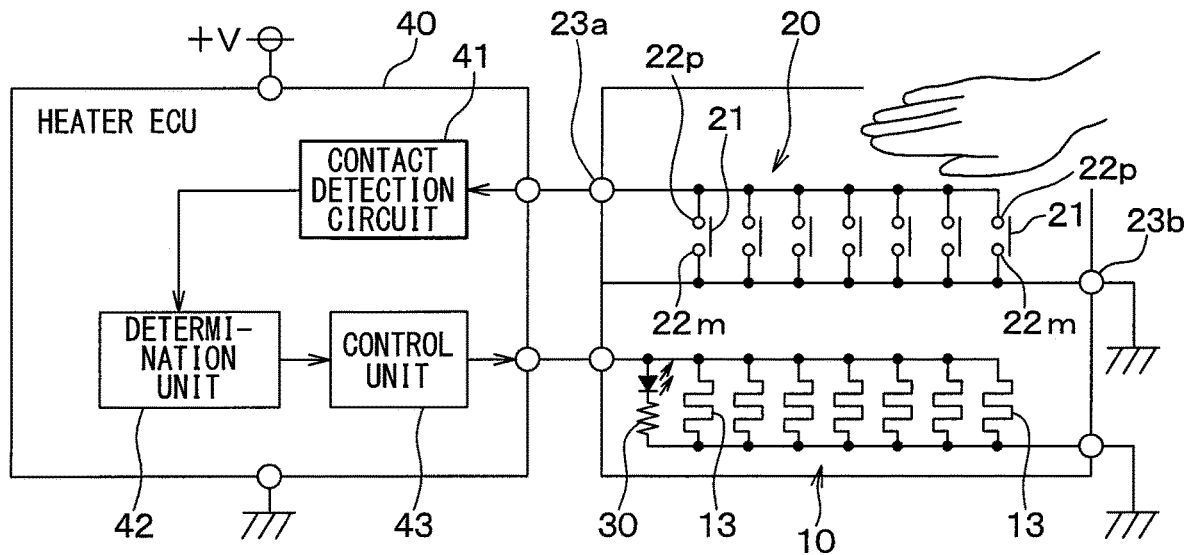
FIG. 5 is a block diagram of the heater device.

A block configuration of the heater device 1 will now be described. As are shown in FIG. 4 and FIG. 5, the heater device 1 has the heater ECU 40 in addition to the heater unit 10 and the contact detection unit 20. The heater ECU 40 includes a contact detection circuit 41, a determination unit 42, and the control unit 43.

The contact detection unit 20 has a large number of the switches each formed of the contact 21, the positive electrode 22p and the negative electrode 22m. The positive electrodes 22p are pulled up via an unillustrated resistor provided in the contact detection circuit 41 while the negative electrodes 22m are grounded via an earth terminal 23b.

When the contact 21 is out of contact with the positive electrode 22p and the negative electrode 22m in all of the switches in the contact detection unit 20, a voltage at a connection terminal 23a of the contact detection unit 20 stays at a high level. When the contact 21 makes contact with the positive electrode 22p and the negative electrode 22m in at least one of the switches in the contact detection unit 20, a voltage at the contact terminal 23a of the contact detection unit 20 shifts to a low level.

The contact detection circuit 41 detects a contact by an object on the heater unit 10 according to a voltage level at the connection terminal 23a of the contact detection unit 20 and outputs a detection signal indicating a detection result to the determination unit 42.

The determination unit 42 determines whether the contact by the object on the heater unit 10 is a continuous contact or a contact made for a switching operation to switch between a start and a stop of energization of the heat generation units 13 according to the detection signal outputted from the contact detection circuit 41, and notifies the control unit 43 of a determination result.

More specifically, the determination unit 42 regularly (in predetermined cycles) collects a detection signal outputted from the contact detection circuit 41. When an object is in contact with the contact detection region ST over a period as long as or longer than a predetermined period, the determination unit 42 determines that the contact by the object on the contact detection region ST is a continuous contact, that is, a spontaneous contact by the occupant.

When the determination unit 42 determines that the contact by the object on the heater unit 10 is a continuous contact, the control unit 43 stops energization of the heat generation units 13.

Meanwhile, when an object is in contact with the contact detection region ST over a period shorter than the predetermined period, the determination unit 42 determines that the contact by the object on the heater unit 10 is a contact made for a switching operation to switch between a start and a stop of energization of the heat generation units 13.

When the determination unit 42 determines that the contact by the object on the heater unit 10 is a contact made for a switching operation to switch between a start and a stop of energization of the heat generation units 13, the control unit 43 switches between a start and a stop of energization of the heat generation units 13.

More specifically, each time the determination unit 42 determines that a contact by an object on the heater unit 10 is a contact made for a switching operation to switch between a start and a stop of energization of the heat generation units 13, the control unit 43 switches between a start and a stop of energization of the heat generation units 13. That is, the control unit 43 stops energization of the heat generation units 13 when the heat generation units 13 are energized and starts energization of the heat generation units 13 when energization of the heater units 13 is stopped. In the manner as above, the control unit 43 makes a switching by toggling between a start and a stop of energization of the heat generation units 13.

According to the configuration described above, when the determination unit 42 determines that a contact by an object on the contact detection region ST is not a contact made for a switching operation, the control unit 43 stops energization of the heat generation units 13 regardless the heat generation units 13 are energized or not. When the determination unit 42 determines that a contact by an object on the contact detection region ST is a contact made for a switching operation, the control unit 43 switches between a start and a stop of energization of the heat generation units 13. Hence, a heater control in response to a heater operation can be performed without having to secure a space to mount a dedicated operation switch. Consequently, flexibility in vehicle layout for the heater device can be ensured.

Incidentally, whether a vehicle air-conditioning device is operating or at rest can be recognized according to an airflow blown out from respective outlets provided to the vehicle, to the contrary, it is difficult to recognize whether the heater device 1 is operating or at rest.

However, the heater device 1 includes the energization state indicator lamp 30 as an indication unit indicating an energization state when the heat generation units 13 are energized. Hence, the heater device 1 enables the occupant to recognize easily whether the heater device 1 is operating or at rest.

Each time the occupant touches the contact detection unit 20, energization of the heater device 1 is started and stopped in a switching manner and the energization state indicator lamp 30 also illuminates and goes off in response to an energization state of the heater device 1. Hence, even when the occupant is unfamiliar with the heater device 1, the occupant can easily make a heater operation.

The contact detection unit 20 has the contact detection region extending in a planar shape. Hence, the occupant can make an operation without having to directly look at the contact detection unit 20. In order to make the detection unit 20 operable by a part other than a fingertip, such as a palm, a knee, and an elbow, and an operation by such a part other than the fingertip detectable by the detection unit 20, it is preferable that the contact detection unit 20 has a predetermined area of at least 10 millimeters×10 millimeters=100 square millimeters.

When a human body (e.g., hand 65 and leg 67) touches the contact detection unit 20, an individual does not feel hot the instant the individual has touched the contact detection unit 20, which is the feature of the heater device 1 that makes the heat detection unit 20 available as an operation switch.

An individual does not feel hot the instant the individual has touched the contact detection unit 20 because each one of a large number of the switches has a small thermal capacity. Each switch has a small thermal capacity because each switch is separated from any other switch via the spacers 23. Accordingly, a size of each switch becomes small and hence a thermal capacity of each switch becomes small.

By making a thermal capacity of the switch small, a decrease in temperature of the contact detection unit 20 due to a contact by an object can be accelerated. Significant transfer of a heat quantity to the object in contact can be thus restricted. Hence, even when a human body touches the contact detection unit 20, a heat quantity instantaneously transferred from the contact detection unit 20 to an individual is so small that the individual does not feel hot fiercely the instant the individual has touched the contact detection unit 20.

It should be noted, however, that when the individual keeps touching the contact detection unit 20, heat continuously transfers from the contact detection unit 20 to the individual and the individual feels hotter gradually. However, in a typical switching operation, a human body moves away from the switch immediately after an individual touches the switch.

By setting thermal conductivity of the cover 24 lower than thermal conductivity of the switches, a temperature of the cover 24 where an individual makes direct contact can be lowered further.

Second Embodiment

Figure 6:
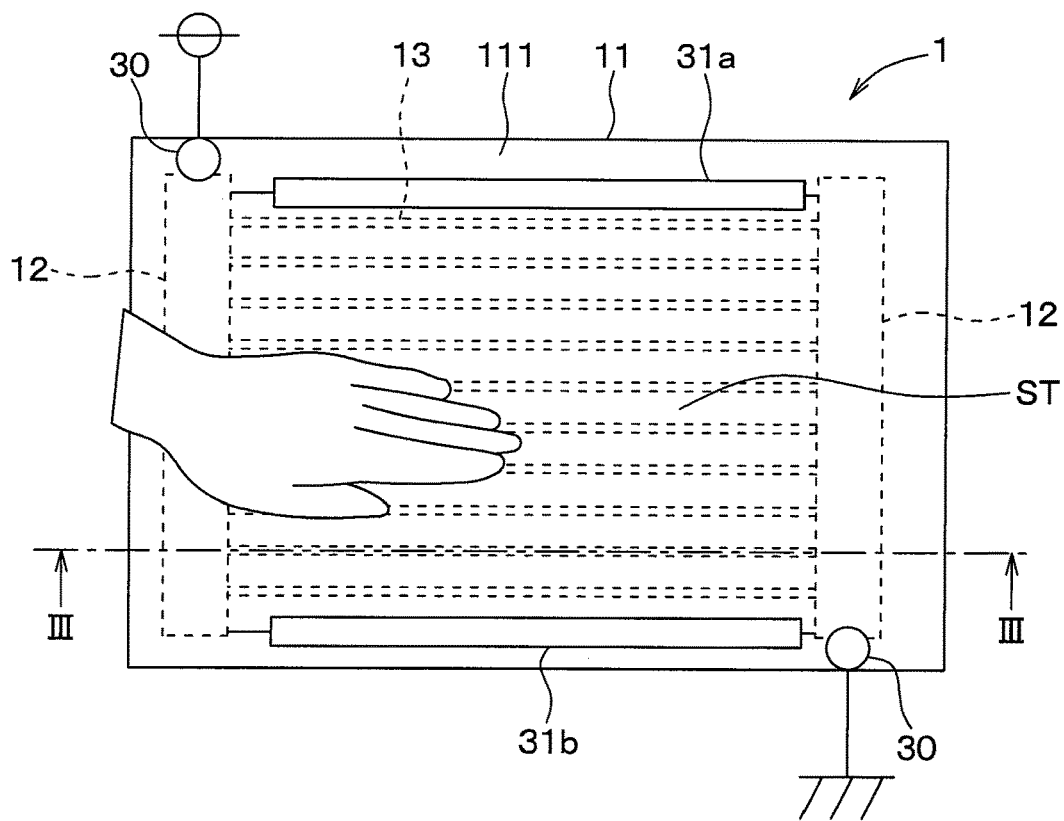
FIG. 6 is a schematic view of a heater device according to a second embodiment.

A heater device 1 of a second embodiment will be described with reference to FIG. 6. The heater device 1 of the first embodiment above has the energization state indicator lamp 30 formed of a small LED chip. The heater device 1 of the present embodiment is different from the counterpart of the first embodiment above in that energization state indicator lamps 31a and 31b each formed of a long LED are provided additionally.

The energization state indicator lamps 31a and 31b are provided to specify a contact detection region ST. To be more specific, the energization state indicator lamps 31a and 31b are provided to sandwich the contact detection region ST from both sides.

By providing the energization state indicator lamps 31a and 31b to specify the contact detection region ST in the manner as above, an occupant can visually recognize a location of the contact detection region ST easily.

In the present embodiment, the energization state indicator lamps 31a and 31b are provided to specify the contact detection region ST. However, the energization state indicator lamps 31a and 31b may be provided to specify an outer frame of a heater unit 10. In such a case, the occupant can recognize not only a location of the heater unit 10, but also whether the heater device 1 is operating or at rest.

In the present embodiment, an effect produced by a configuration common with the first embodiment above can be obtained in the same manner as in the first embodiment above.

Third Embodiment

Figure 7:
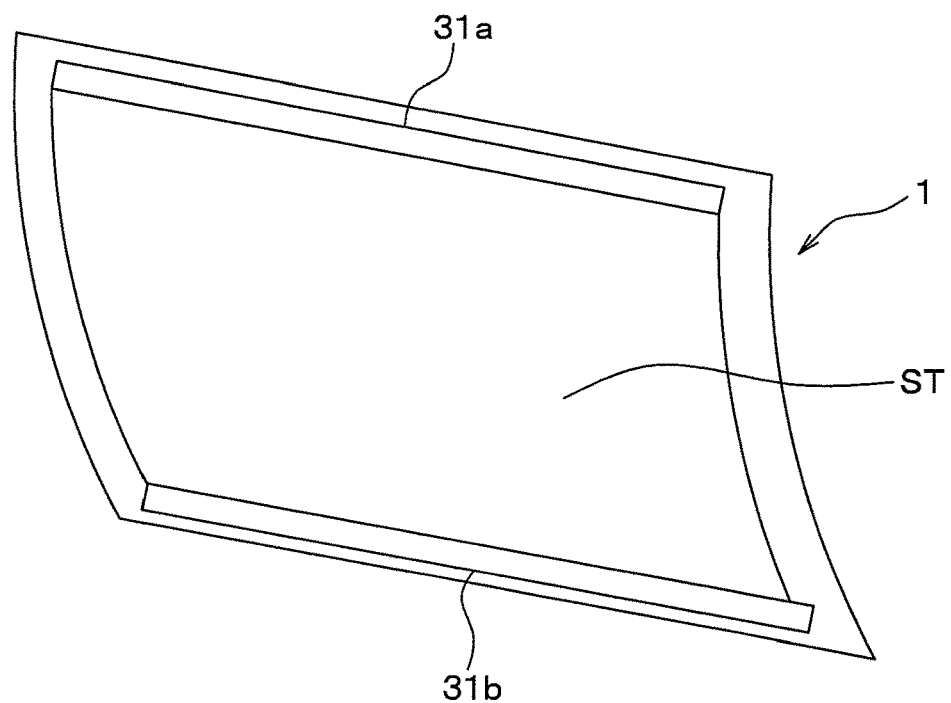
FIG. 7 is a schematic view of a heater device according to a third embodiment.

A heater device of a third embodiment will be described with reference to FIG. 7. The heater devices of the first and second embodiments above are formed in such a manner that neither the heater unit 10 nor the contact detection unit 20 can curve. By contrast, the heater device 1 of the present embodiment includes a heater unit 10 and a contact detection unit 20 that can curve. The heater device 1 of the first and second embodiments above has the energization state indicator lamps 31a and 31b emitting blue light. However, the heater device 1 of the present embodiment has conduction state indicator lamps 31a and 31b emitting light of a warm color. To be more specific, the energization state indicator lamps 31a and 31b emit any one of red light, orange light, and yellow light.

The energization state indicator lamps 31a and 31b are provided to specify a contact detection region ST of a heater unit 10. To be more specific, the energization state indicator lamps 31a and 31b are provided to sandwich the contact detection region ST from both sides.

By providing the heater unit 10 and the contact detection unit 20 that can curve as above, even when an attachment portion for the heater device 1 is not in a flat shape, the heater device 1 can be attached to the attachment portion for the heater device 1 in close adhesion.

An unillustrated support member is provided in a region where the conduction state indicator lamps 31a and 31b are provided for the heater unit 10 and the contact detection unit 20 not to curve.

In the present embodiment, an effect produced by a configuration common with the first embodiment above can be obtained in the same manner as in the first embodiment above.

In the present embodiment, the heater unit 10 and the contact detection unit 20 that can curve are provided. However, the heater unit 10 and the contact detection unit 20 that can bend at an angle may be provided as well.

Fourth Embodiment

Figure 8:
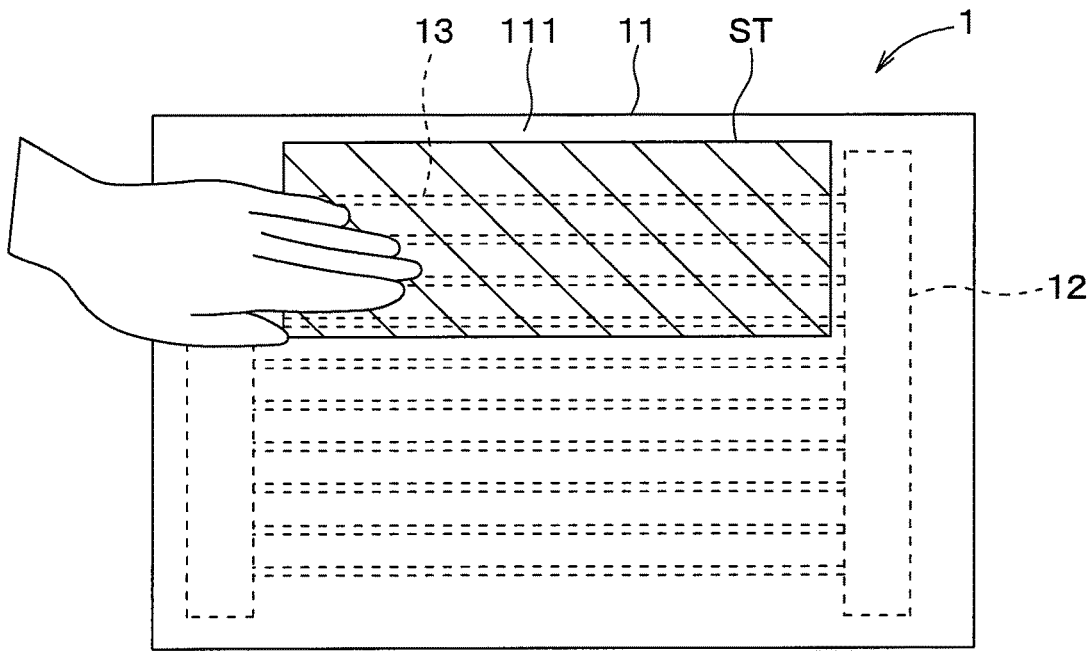
FIG. 8 is a schematic view of a heater device according to a fourth embodiment.
Figure 9:
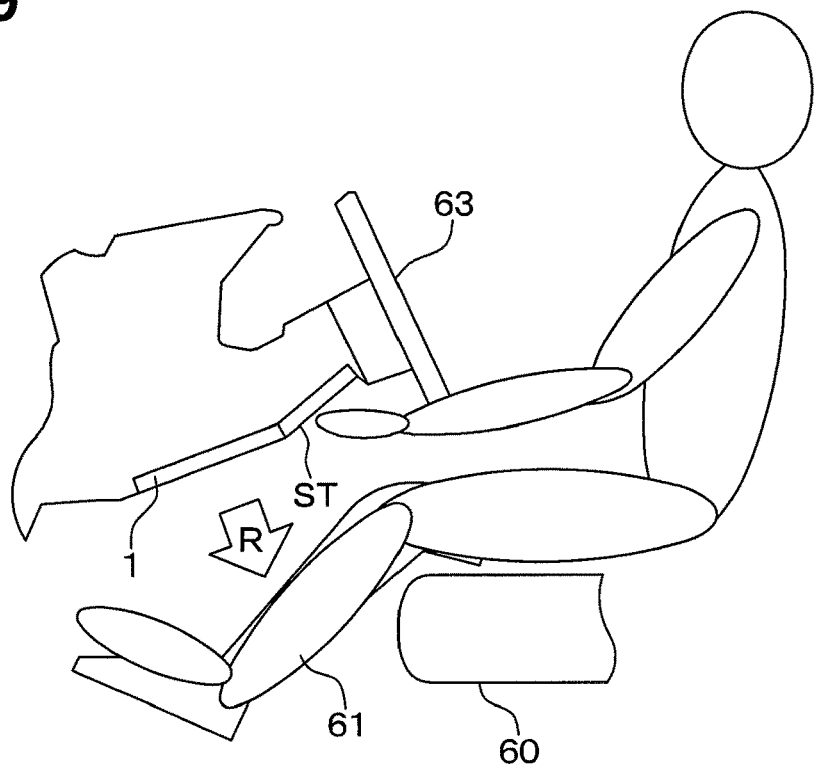
FIG. 9 is a view of the heater device of the fourth embodiment.

A heater device of a fourth embodiment will be described with reference to FIG. 8, FIG. 9, FIG. 10, FIG. 11, FIG. 12, and FIG. 13. In the heater device 1 of the first embodiment above, the contact detection region ST of the contact detection unit 20 is provided substantially all over the heater unit 10. By contrast, in a heater device 1 of the present embodiment, as shown in FIG. 8, a contact detection region ST of a connect detection unit 20 is provided to cover a part of a heater unit 10. To be more specific, as shown in FIG. 9, the contact detection region ST is provided to the heater 10 in a region easy to reach for an occupant by hand, that is, a first region located on a side close to the occupant. The contact detection region ST is not provided in a region hard to reach for the occupant by hand, that is, a second region located more on a front side of the vehicle than the region ST.

Figure 10:
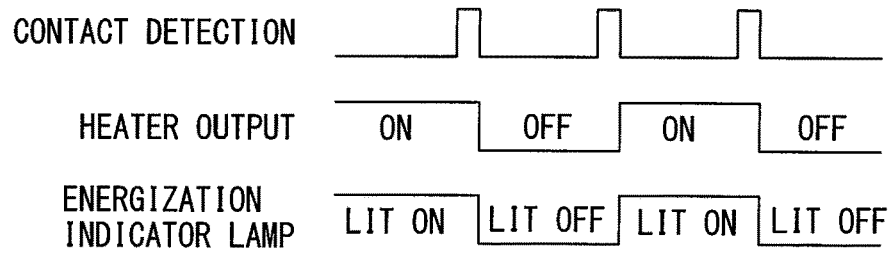
FIG. 10 is a timing chart showing a contact operation and a control on a heater output and an energization indicator lamp in the heater device of the fourth embodiment.
Figure 11:
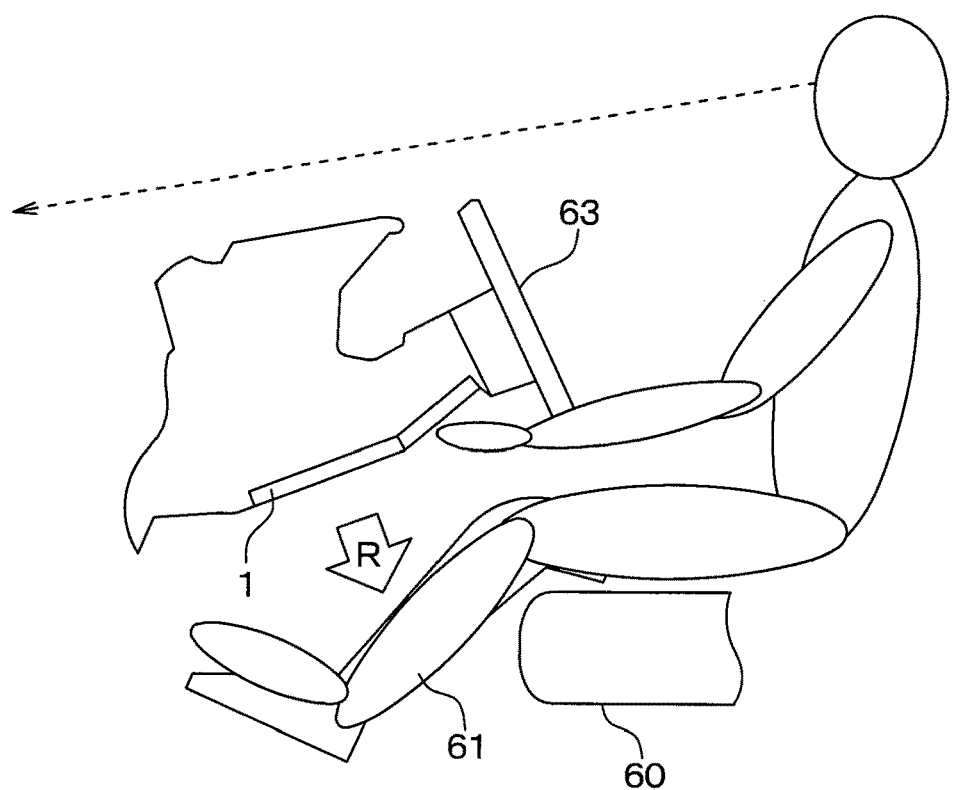
FIG. 11 is a view showing a contact operation on a contract detection region.

Referring to FIG. 10 and FIG. 11, the following will describe a control by a control unit 43 on a heater output and a conduction state indicator lamp 30 when the contact detection unit 20 detects a contact made for a switching operation. The switching operation represents a switching operation to switch between a start and a stop of energization of heat generation units 13.

Herein, assume that the heat generation units 13 are energized and a heater output is on, and hence the energization state indicator lamp 30 is lit on. In such a circumstance, when the occupant makes a touch operation on the contact detection unit 20 as shown in FIG. 11 and a contact by an object over a period shorter than a predetermined period is detected by the contact detection unit 20, a determination unit 42 determines that the contact by the object on the heater unit 10 is a contact made for a switching operation to switch between a start and a stop of energization of the heat generation units 13. The control unit 43 thus switches between a start and a stop of energization of the heat generation units 13. To be more specific, energization of the heat generation unit 13 is stopped to turn off the heater output and the energization state indicator lamp 30 is lit off.

When a contact by an object over a period shorter than the predetermined period is detected again by the contact detection unit 20, the determination unit 42 determines that the contact by the object on the heater unit 10 is a contact made for a switching operation to switch between a start and a stop of energization of the heat generation units 13. The control unit 43 thus switches between a start and a stop of energization of the heat generation units 13. To be more specific, energization of the heat generation units 13 is started again to turn on the heater output and the energization state indicator lamp 30 is lit on.

In the manner as above, the control unit 43 switches between a start and a stop of energization of the heat generation units 13 each time a contact by an object is detected by the contact detection unit 20, and the energization state indicator lamp 30 is lit on or off in a switching manner according to an energization state to the heat generation units 13.

Figure 12:
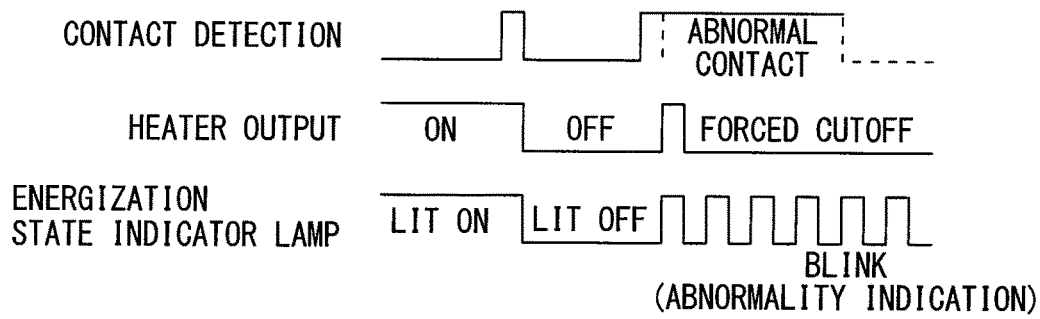
FIG. 12 is a timing chart showing a contact detection and a control on the heater output and the energization indicator lamp in the heater device of the fourth embodiment.
Figure 13:
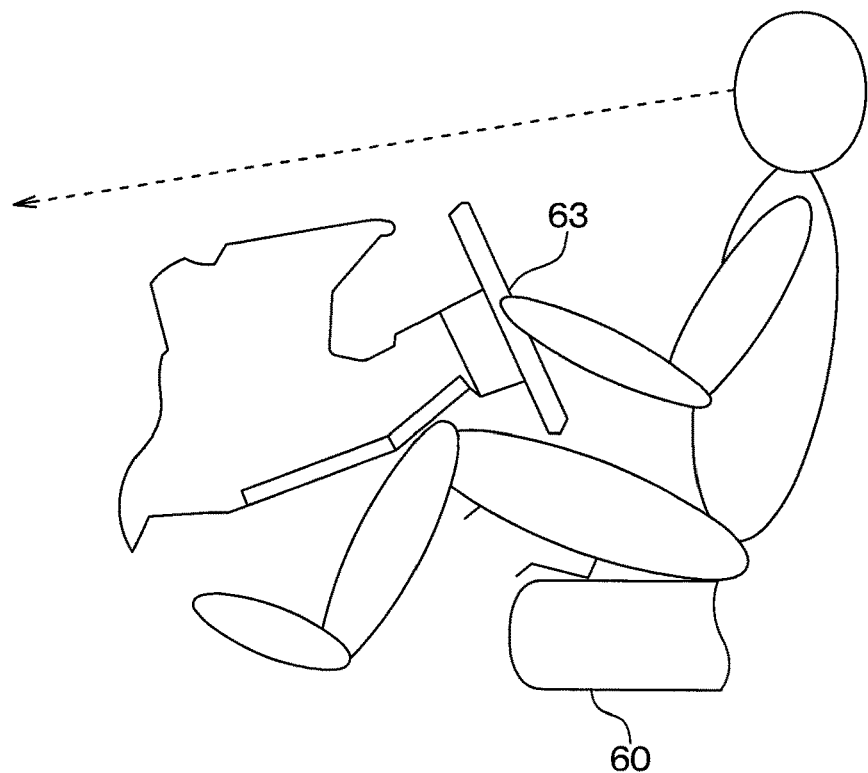
FIG. 13 is a view showing a contact on the contact detection region.

Referring to FIG. 12 and FIG. 13, the following will describe a control by the control unit 43 of a heater ECU 40 on the heater output and the energization state indicator lamp 30 when a contact by an object on the heater unit 10 is detected by the contact detection unit 20.

Herein, assume that the heat generation units 13 are energized and the heater output is on, and hence the energization state indicator lamp 30 is lit on. In such a circumstance, when a body of the occupant touches the contact detection region ST as shown in FIG. 13 and a contact by an object over a period shorter than the predetermined period is detected by the contact detection unit 20, as shown in FIG. 12, the control unit 43 stops energization of the heat generation units 13 to turn off the heater output and controls the energization state indicator lamp 30 to go off.

When the body of the occupant keeps touching the contact detection unit 20 as shown in FIG. 13 and a contact by an object is detected by the contact detection unit 20, the determination unit 42 determines that the contact by the object on the heater 10 is a continuous contact by the object. The control unit 43 thus stops energization of the heat generation units 13 to turn off the heater output and controls the energization indicator lamp 30 to blink.

In the manner as above, when a continuous contact by an object on the contact detection region is detected by the contact detection unit 20, the control unit 43 forcedly cuts off energization of the heat generation units 13 to turn off the heater output while controlling the energization state indicator lamp 30 to blink as a sign of an abnormality.

Although it is not shown in FIG. 11, assume that a contact by an object over a period shorter than the predetermined period is detected again by the contact detection unit 20 after the continuous contact by the object on the contact detection region is no longer detected by the contact detection unit 20. Then, the determination unit 42 determines that the contact by the object on the heater unit 10 is a contact made for a switching operation to switch between a start and a stop of energization of the heat generation units 13. The control unit 43 thus switches between a start and a stop of energization of the heat generation units 13. To be more specific, energization of the heat generation units 13 is started again and the energization state indicator lamp 30 is lit on.

In the present embodiment, an effect produced by a configuration common with the first embodiment above can be obtained in the same manner as in the first embodiment above.

As has been described, the contact detection region ST of the contact detection unit 20 is provided in the easy-to-reach region for the occupant by hand. Hence, the occupant can easily turn on and off the heater output. The contact detection region ST of the contact detection unit 20 is not provided in the hard-to-reach region for the occupant by hand. Hence, the heater output is not turned on or off when a human body or clothes accidentally touch the heater device 1.

Fifth Embodiment

A heater device 1 of a fifth embodiment will be described. A configuration of the heater device 1 of the present embodiment is same as the configuration of the heater device of the fourth embodiment above. In the heater device 1 of the fourth embodiment above, the heater ECU 40 switches between a start and a stop of energization of the heater units 13 in response to a contact by an object on the contact detection unit 20. The heater device 1 of the present embodiment is different from the first embodiment above in that a heater ECU 40 not only switches between a start and a stop of energization of heat generation units 13 in response to a contact by an object on a contact detection unit 20, but also switches a heater output in three levels including a low level, a medium level, and a high level.

Figure 14:
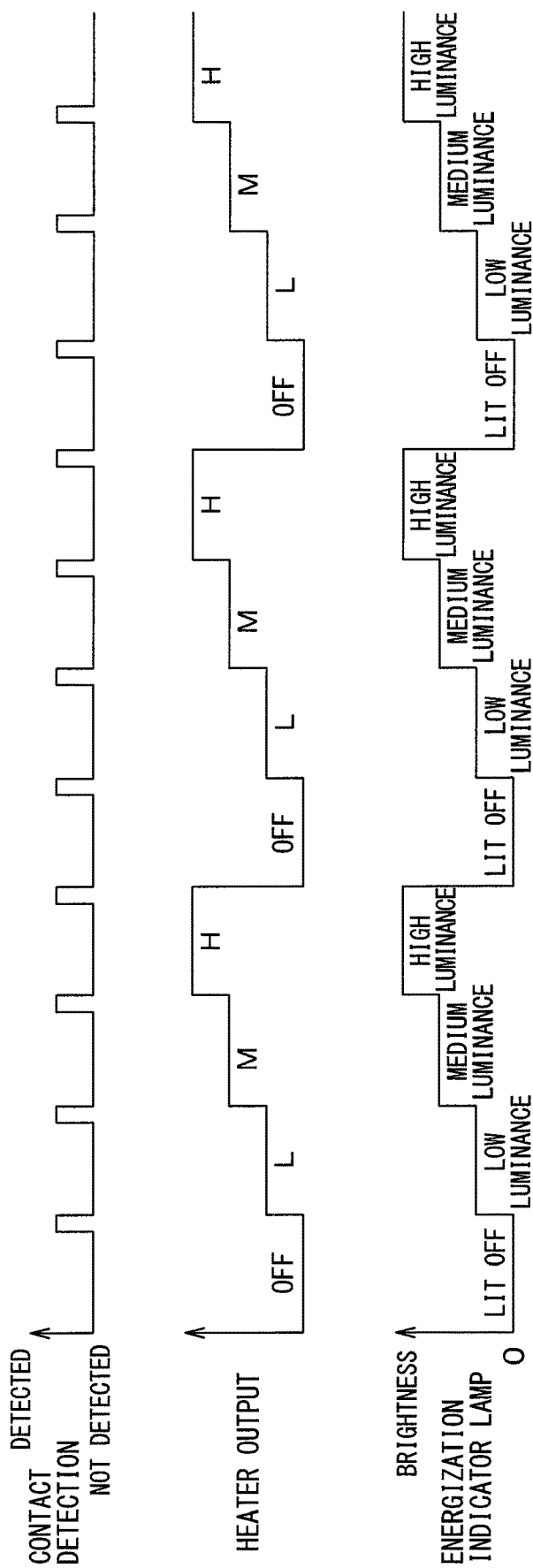
FIG. 14 is a timing chart showing a contact operation and a control on a heater output and an energization indicator lamp in a heater device of a fifth embodiment.

Referring to FIG. 14, the following will describe a control by a control unit 43 on a heater output and an energization state indicator lamp 30 when a contact made for a switching operation to switch between a start and a stop of energization of the heat generation units 13 is detected by the contact detection unit 20.

Herein, assume that energization of the heat generation units 13 is stopped and the heater output is turned off, and hence the energization state indicator lamp 30 is lit off. In such a circumstance, when an occupant makes a touch operation on the contact detection unit 20, a contact by an object over a period shorter than a predetermined period is detected by the contact detection unit 20. Then, a determination unit 42 determines that the contact by the object on a heater unit 10 is a contact made for a switching operation to switch between a start and a stop of energization of the heat generation units 13. The control unit 43 thus starts energization of the heat generation units 13 while adjusting the heater output to be at the low level and controls the energization state indicator lamp 30 to illuminate at a low luminance level. In the drawing, the low level is indicted by a capital L.

When the occupant makes a touch operation on the contact detection unit 20 again later, a contact by an object over a period shorter than the predetermined period is detected by the contact detection unit 20. Then, the determination unit 42 determines that the contact by the object on the heater unit 10 is a contact made for a switching operation to switch between a start and a stop of energization of the heat generation units 13. The control unit 43 thus starts energization of the heat generation units 13 while adjusting the heater output to be at the medium level and controls the energization state indicator lamp 30 to illuminate at a medium luminance level. Luminance at the medium luminance level is higher than luminance at the low luminance level. In the drawing, the medium level is indicted by a capital M.

When the occupant makes a touch operation on the contact detection unit 20 once again later, a contact by an object over a period shorter than the predetermined period is detected by the contact detection unit 20. Then, the determination unit 42 determines that the contact by the object on the heater unit 10 is a contact made for a switching operation to switch between a start and a stop of energization of the heat generation units 13. The control unit 43 thus starts energization of the heat generation units 13 while adjusting the heater output to be at the high level and controls the energization state indicator lamp 30 to illuminate at a high luminance level. Luminance at the high luminance level is higher than luminance at the medium luminance level. In the drawing, the high level is indicated by a capital H.

When the occupant makes a touch operation on the contact detection unit 20 twice again later, a contact by an object over a period shorter than the predetermined period is detected by the contact detection unit 20. Then, the determination unit 42 determines that the contact by the object on the heater unit 10 is a contact made for a switching operation to switch between a start and a stop of energization of the heat generation units 13. The control unit 43 thus stops energization of the heat generation units 13 to turn off the heater output and controls the energization state indicator lamp 30 to go off.

As has been described above, in the heater device 1, the output level is switched sequentially to be off, at the low level, the medium level, and the high level, and to be off in a repetitive manner each time the occupant makes a touch operation on the contact detection unit 20 and a contact by an object over a period shorter than the predetermined period is detected by the contact detection unit 20. The energization state indicator lamp 30 is switched sequentially to go off, to illuminate at the low illuminance level, the medium illuminance level, and the high luminance level, and to go off in a repetitive manner according to the output level.

Figure 15:
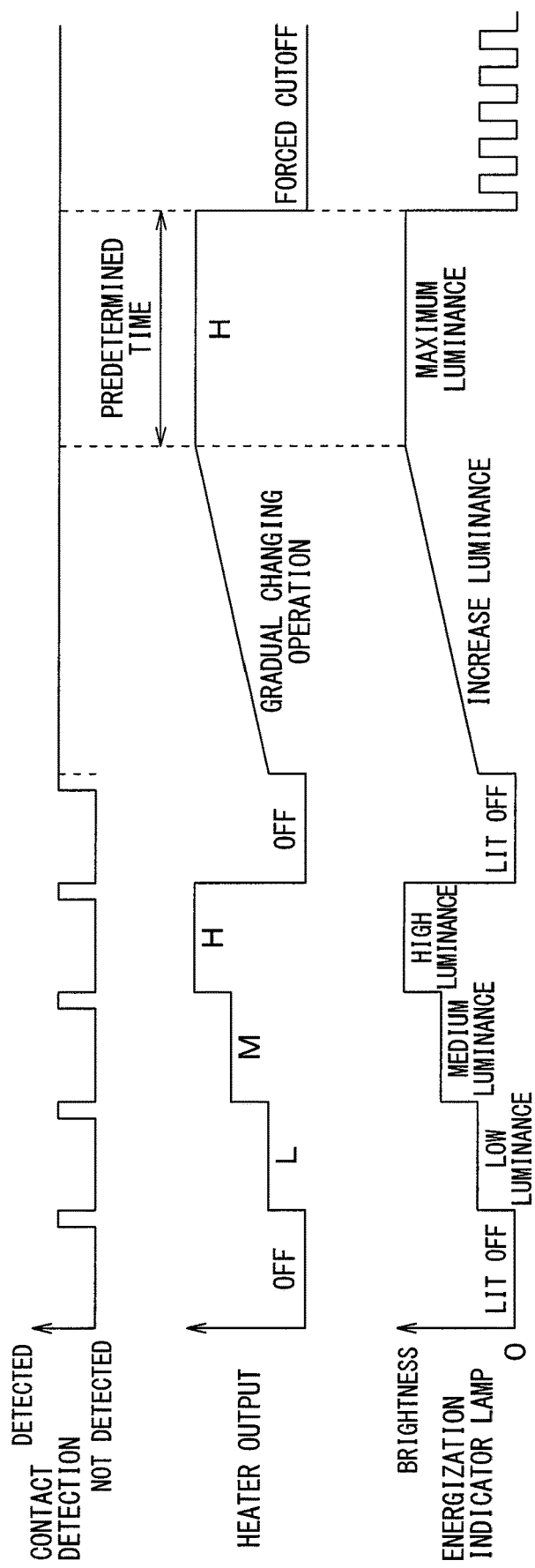
FIG. 15 is a timing chart showing a contact detection and a control on the heater output and the energization indicator lamp in the heater device of the fifth embodiment.

Referring to FIG. 15, the following will describe a control by the control unit 43 on the heater output and the energization state indicator lamp 30 when a contact by an object on the heater unit 10 is detected by the contact detection unit 20.

Herein, assume that energization of the heat generation units 13 is stopped and the heater output is turned off, and hence the energization state indicator lamp 30 is lit off. In such a circumstance, when the occupant makes a touch operation on the contact detection unit 20, a contact by an object over a period shorter than the predetermined time is detected by the contact detection unit 20. Then, the determination unit 42 determines that the contact by the object on the heater unit 10 is a contact made for a switching operation to switch between a start and a stop of energization of the heat generation units 13. The control unit 43 thus starts energization of the heat generation units 13 while adjusting the heater output to be at the low level and controls the energization state indicator lamp 30 to illuminate at the low luminance level. In the drawing, the low level is indicated by a capital L.

In the manner as above, the output level is switched sequentially to be at the low level, the medium level, and the high level, and to be off each time the occupant makes a touch operation on the contact detection unit 20 and a contact by an object over a period shorter than the predetermined period is detected by the contact detection unit 20. The energization state indicator lamp 30 is also switched to illuminate at the low luminance level, the medium luminance level, and the high luminance level, and to go off according to the output level.

For example, assume that a body of the occupant is spontaneously in contact with the contact detection region ST and a contact by an object over a period as long as or longer than the predetermined time is detected by the contact detection unit 20. Then, the determination unit 42 determines that the contact by the object on the heater unit 10 is a continuous contact by the object. The control unit 43 thus gradually increases the heater output to 100% and also gradually increases luminance of the energization state indicator lamp 30 to 100%.

By gradually increasing the heater output to 100% in the manner as above, the occupant can be notified of a continuous contact by an object on the heater unit 10. By gradually increasing luminance of the energization state indicator lamp 30, the occupant can be notified visually of a continuous contact by an object on the heater unit 10.

When a predetermined period H elapses after the heater output has been increased to 100%, the control unit 43 forcedly cuts off the heater output and controls the energization state indicator lamp 30 to blink as a sign of an abnormality.

By forcedly cutting off the heater output as above, a thermal uncomfortable feeling the occupant may otherwise have can be eliminated. By controlling the energization state indicator lamp 30 to blink as a sign of an abnormality, the occupant can be notified that the heater output is forcedly cut off.

In the present embodiment, an effect produced by a configuration common with the first embodiment above can be obtained in the same manner as in the first embodiment above.

Sixth Embodiment

A heater device 1 of a sixth embodiment will be described with reference to FIG. 16. The contact detection unit 20 of the respective embodiments above is formed by providing the switches of a same size at regular intervals. By contrast, a contact detection unit 20 of the present embodiment is formed by providing switches of different sizes at different intervals.

Figure 16:
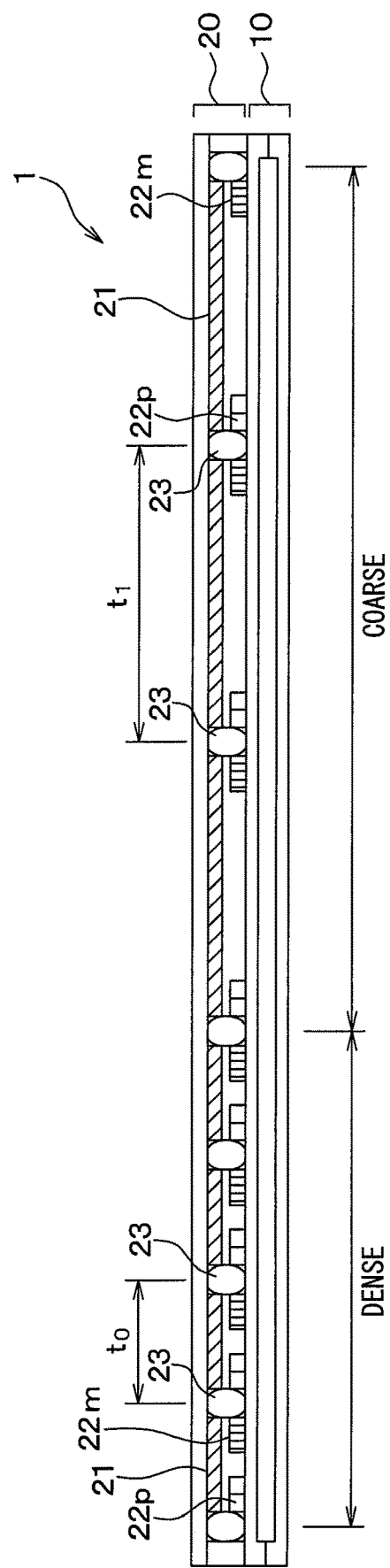
FIG. 16 is a view of a modification in which switches of different sizes are provided to a contact detection unit.

More specifically, as shown in FIG. 16, the contact detection unit 20 includes switches provided in a dense region where $t_0$ is given as an interval between adjacent spacers 23 and a coarse region where $t_1$ is given as an interval between adjacent spacers 23. Switches provided in the coarse region are larger than switches provided in the dense region. The interval $t_0$ is shorter than the interval $t_1$.

By providing relatively small switches at a short interval in a portion operated by a fingertip, an operation made by the fingertip can be detected with high accuracy.

By providing relatively large switches in a portion operated by a palm or a knee, a contact operation by an object can be detected in a reliable manner.

In the present embodiment, an effect produced by a configuration common with the first embodiment above can be obtained in the same manner as in the first embodiment above.

Seventh Embodiment

A heater device 1 of a seventh embodiment will be described with reference to FIGS. 17A to 17F. In the respective embodiments above, the heater device 1 is installed underneath the steering column 62 provided to the vehicle to be opposed to the occupant 61 seated in the driver's seat. However, a location of the heater device 1 is not limited to the location specified above.

For example, the heater device 1 can be provided as shown in FIG. 17A to at least one of wall surfaces in a compartment located above, on a left side, and on a right side of legs of an occupant seated in a passenger seat (in the drawing, indicated by seat P).

The heater device 1 can be provided as shown in FIG. 17B to at least one of wall surfaces in the compartment located above, on a left side, and on a right side of legs of an occupant seated in a driver's seat (in the drawing, indicated as seat D).

The heater device 1 can be provided as shown in FIG. 17C to a door trim of at least one of a door for an occupant to be seated in the driver's seat and a door for an occupant to be seated in the passenger seat.

The heater device 1 can be provided as shown in FIG. 17D to a back side of a seat for an occupant to be seated in the passenger seat to emit radiation heat toward an occupant seated in a left backseat. The heater device 1 can be provided as shown in FIG. 17E to a back side of a seat for an occupant to be seated in the driver's seat to emit radiation heat toward an occupant seated in a right backseat The heater device 1 can be provided as shown in FIG. 17F to a door trim of at least one of a door for an occupant to be seated in the left backseat and a door for an occupant to be seated in the right backseat.

In the present embodiment, an effect produced by a configuration common with the first embodiment above can be obtained in the same manner as in the first embodiment above.

Eighth Embodiment

Figure 18:
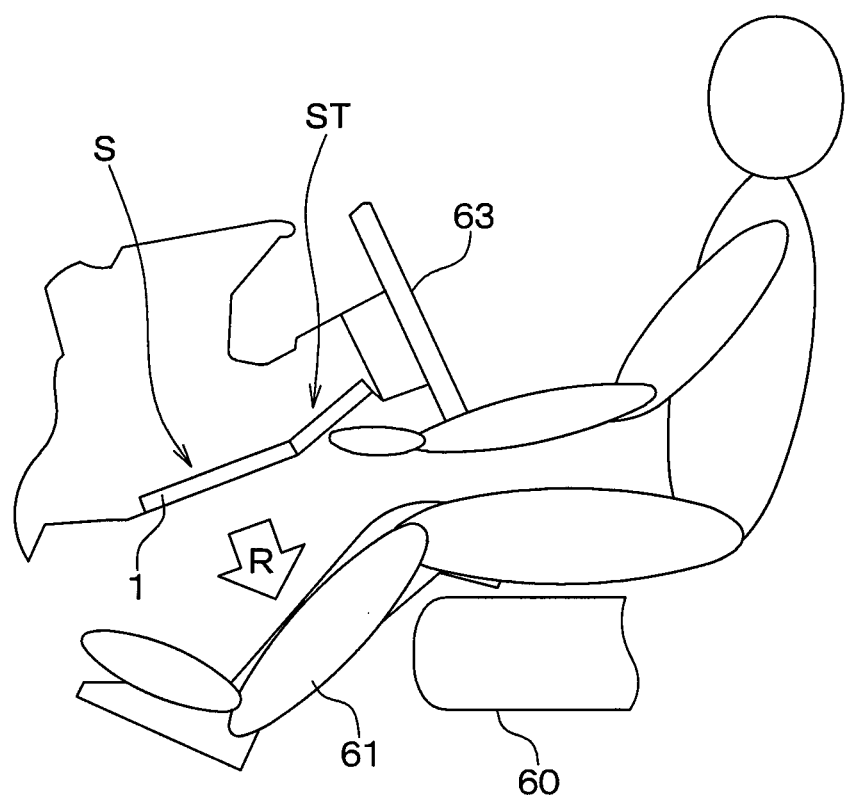
FIG. 18 is a view of a modification in which a contact detection region detecting a contact and functioning as a switch and a region not functioning as a switch but functioning to detect a contact are provided.

A heater device of an eighth embodiment is shown in FIG. 18. The heater device 1 of the first embodiment above has the contact detection region ST detecting a contact and functioning as a switch, and the region S not functioning as a switch but functioning to detect a contact.

A contact detection region ST of the present embodiment is same as the contact detection region ST of the respective embodiments above.

However, when an object makes contact with a region S not functioning as a switch but functioning to detect a contact, a control unit 43 stops energization of heat generation units independently of a period of contact by the object on the region S. That is, even when an occupant makes a touch operation on the region S, the control unit 43 stops energization of the heat generation units without switching between on and off states of a heater output.

Hence, an entire detection region can be divided on the contact detection region ST detecting a contact and functioning as a switch and the region S not functioning as a switch but functioning to detect a contact.

In the present embodiment, an effect produced by a configuration common with the first embodiment above can be obtained in the same manner as in the first embodiment above.

Other Embodiments (1) In the embodiments above, the heater ECU 40 switches between a start and a stop of energization of the heat generation units 13 according to a contact by an object detected by the contact detection unit 20. However, an air conditioning ECU of a vehicle air-conditioning device and a heater ECU 40 may be connected to each other. In such a case, the heater ECU 40 may obtain an operation signal to an air-conditioning panel connected to the air-conditioning ECU from the air-conditioning ECU to switch between a start and a stop of energization of heat generation units 13 according to the obtained operation signal.

(2) In the respective embodiments above, the heater device 1 includes the energization state indicator lamp 30 and the like. However, an energization state indictor lamp 30 may be provided to, for example, a meter of a vehicle or an instrument panel of the vehicle. By providing the energization state indicator lamp 30 to the meter of the vehicle, the instrument panel of the vehicle or the like, an occupant is enabled to recognize an operating state of a heater device 1 while the occupant keeps looking ahead of the vehicle without deviating a visual line considerably.

(3) In the embodiments above, the operation indicator lamps 30, 31a, and 31b are formed of LEDs. However, operation indicator lamps 30, 31a, and 31b may be formed of light guide plates as described in, for example, Japanese Patent No. 4990952. By forming the operation indicator lamps 30, 31a, and 31b using light guide plates, the operation indicator lamps 30, 31a, and 31b may function also as illumination lamps.

(4) The respective embodiments above have described a case where the heater device 1 is mounted to a vehicle used in an area where a vehicle keeps left under traffic regulations. For a vehicle used in an area where a vehicle keeps right under traffic regulations, the right and the left in the description above are reversed.

(5) In the respective embodiments above, the contact detection unit 20 is formed by providing a large number of the switches having the contacts 21. However, a contact by an object can be detected by a method other than the contact method described above. For example, a capacitive sensor may be laminated on a heater unit 10 to detect a contact by an object or approaching of an object. Further, an optical sensor or a sonar sensor may be provided to a frame of a heater device 1 to detect a contact by an object or approaching of an object.

(6) In the fifth and sixth embodiments above, the heater output is switched in three levels including the low level, the medium level, and the high level. However, a heater output may be switched in two high levels and a heater output may be switched in four or more levels.

(7) In the second and third embodiments above, the energization state indicator lamps 31a and 31b are provided to specify the contact detection region ST of the heater unit 10. However, energization state indicator lamps 31a and 31b may be provided to specify an outer shape of a heater unit 10.

(8) The respective embodiments above have described a case where the heater device 1 is mounted to a road motor vehicle. However, applicable subjects of the heater device are not limited to a road motor vehicle. For example, a heater device may be provided to a cabin of a mobile object, such as a ship and an airplane, a room in a building built solidly on the ground.

The present disclosure is not limited to the embodiments described above and can be modified in various manners. The respective embodiments are not irrelevant to one another and can be combined as needed unless a combination is apparently infeasible. In a case where the embodiments above have described numerical values of components, such as the numbers, numerical figures, amounts, and ranges, the components are not limited to the numerical values specified above unless the numerical values have been explicitly described as being essential and the components are theoretically limited to the numerical values specified above.

The invention claimed is:

1. A heater device comprising:
   a heater unit including a heat generation unit for generating and emitting radiation heat when energized;
   a contact detector having a contact detection region that overlies the heater unit to detect a contact from a user on the contact detection region;
   a determination unit comprising circuitry for turning on an operation switch to start of energization of the heat generation unit when the contact detector detects the contact from said user on the contact detection region;
   a controller connected to said determination unit to turn off an operation switch to stop energization of the heat generation unit, when no said contact is made on the contact detection region, and configured to switch between a start and a stop of energization of the heat generation unit based on the determination of said contact on the contact detection region for the operation switch; and
   a display unit indicating an energization state of the heat generation unit when the heat generation unit is energized, and the display unit is located on the heat generation unit, wherein
   the contact detection region is provided under a steering column in front of a driver's seat in a vehicle, and
   when the determination unit determines that the contact by the user on the contact detection region is not the contact made for the operation switch, the controller controls the display unit to change a display mode from a predetermined mode made in case of the contact made for the operation switch to thereby indicate an abnormal contact different from the contact made for the operation switch.

2. The heater device according to claim 1, wherein
   the display unit is provided to specify the contact detection region.

3. The heater device according to claim 2, wherein
   the contact detection region is formed to extend in a planar shape.

4. The heater device according to claim 3, wherein
   the contact detection region has a predetermined area sufficient to detect a contact by an object other than a fingertip.

5. The heater device according to claim 3, wherein when a period of the contact by the user on the contact detection region is shorter than a predetermined period, the determination unit determines that the contact by the user on the contact detection region is the contact made for the operation switch.

6. The heater device according to claim 5, wherein when the period of the contact by the user on the contact detection region is longer than the predetermined period, the determination unit determines that the contact by the user on the contact detection region is not the contact made for the operation switch.

7. The heater device according to claim 1, wherein the controller switches between a start and a stop of energization of the heat generation unit each time the determination unit determines that the contact by the user on the heater unit is a contact made for a predetermined heater operation.

8. The heater device according to claim 1, wherein
   the contact detection region is provided in a first region located on a side close to an occupant in a region overlying the heater unit, and
   the contact detection region is not provided in a region located more on a front side of a vehicle than the first region.

9. The heater device according to claim 1, wherein the contact detection region has a plurality of switches detecting the contact by the user on the contact detection region, and the plurality of switches are provided at different intervals.

10. The heater device according to claim 9, wherein
    the plurality of switches are provided in a first region and a second region, and
    switches provided in the first region among the plurality of switches are larger than switches provided in the second region among the plurality of switches.

11. The heater device according to claim 1, wherein the contact detection region is provided to be contactable by both of a hand and a leg of a passenger in the vehicle.

\* \* \* \* \*